United States Patent
Platteter et al.

(10) Patent No.: US 7,440,127 B2
(45) Date of Patent: Oct. 21, 2008

(54) INTERFACE CONVERTER FOR IMAGE PROCESSING SYSTEMS

(75) Inventors: Dale T. Platteter, Fairport, NY (US); Robert S. Westfall, Rochester, NY (US); Andrew D. Szalasny, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 888 days.

(21) Appl. No.: 10/881,464

(22) Filed: Jun. 30, 2004

(65) Prior Publication Data

US 2006/0001902 A1    Jan. 5, 2006

(51) Int. Cl.
G06F 3/12    (2006.01)
G06F 15/00    (2006.01)

(52) U.S. Cl. ..................... 358/1.15; 358/1.13

(58) Field of Classification Search ........... 358/1.15, 358/1.13, 1.14, 1.16, 1.17, 1.18, 1.1, 1.3, 358/1.4, 1.6, 1.9, 407, 468, 437, 404, 444, 358/401; 399/1, 8; 347/2, 3, 5, 14; 710/5, 710/8, 15, 20, 24, 64, 72

See application file for complete search history.

(56) References Cited

U.S. PATENT DOCUMENTS

| 5,629,775 | A | * | 5/1997 | Platteter et al. ............. 358/296 |
| 7,268,905 | B2 | * | 9/2007 | Hohensee et al. .......... 358/1.15 |
| 2003/0041274 | A1 | | 2/2003 | Platteter et al. |

* cited by examiner

Primary Examiner—Dov Popovici
(74) Attorney, Agent, or Firm—Fay Sharpe LLP

(57) ABSTRACT

An apparatus for mutually converting signals between one or more modular printing devices and a document processing system, includes a device controller having a network interface for communicating with a system communications channel, memory for storing data and control code related to the operation of the modular printing devices, and a processor for running the control code, a digital input/output controller for receiving and sending document processing signals, a connector for receiving and sending modular printing device signals, and an optical input/output isolator for optically isolating the signals received via the connector.

20 Claims, 8 Drawing Sheets

INTERFACE CONVERTER FOR IMAGE PROCESSING SYSTEMS

BACKGROUND

The present exemplary embodiment relates to image processing systems, such as copiers and printers. It finds particular application in conjunction with print systems having multiple feeding and finishing modules and will be described with particular reference thereto. However, it is to be appreciated that the present exemplary embodiment is also amenable to other like applications.

In the early days of copiers and printers, media, typically paper, were fed to a tray where the operator took them and performed manual finishing operations. These manual operations ranged from simple collation and stapling to more sophisticated operations such as folding and inserting in an envelope for mailing. Later products incorporated finishing functionality within the print engine to relieve the operator of these manual finishing functions. Finishing operations included collation, stapling and in more recent products, binding. The same revolution has also occurred in feeding applications. Operators typically placed cut sheet paper or other media in feeding devices. Now, there are large roll feeders which eliminate the need for cut sheet media.

However, these reproduction machines were monolithic. That is, the feeding and finishing devices were packaged with the marking engine into a single device. This gave the customer an integrated solution and limited what had to be controlled in terms of hardware and software. The problem with this approach was that if a customer wanted additional feeding and finishing devices, there was no way to meet these needs. Customers wanted to be able to configure the feeding and finishing devices connected to the other devices. An early solution to the problem with the monolithic devices was the Document Finishing Architecture (or DFA) developed by Xerox Corporation, Stamford, Conn. It was called this because when this interface was conceived, it was not envisioned that it would be used for feeding devices. As it turns out, a version of this interface was used for several feeding devices. DFA is a non-integrated solution. In other words, it is not integrated with the base system with respect to electrical and software control. The initial implementation of DFA did nothing more than connect a single wire to the jam signal of the base machine. When there was a jam in the DFA module, it would assert the jam signal to keep the base engine from continuing to feed sheets into the DFA device. Because the implementation was not integrated, when there was a jam in the DFA device, it was up to the operator to determine how and where to restart the job so that the desired output was achieved. DFA evolved slightly since the initial implementation. It was never integrated with the base model of the machines.

The limitations of DFA were soon realized, however, as customers wanted an integrated solution for document processing. The problem was that each customer wanted a different solution. Manufacturers could not design a custom solution for each customer, as that would not have been cost effective. Under these circumstances, a new standard for attaching feeding and finishing devices to print engines was developed by Xerox Corporation. The standard was used by Xerox for developing new document processing products and by third party vendors for developing feeding and finishing modules. The third party feeding and finishing modules were compatible with Xerox's print engines and other document processing products.

Aspects of the standard are described in U.S. Pat. No. 5,629,775 to Platteter et al, entitled "System Architecture for Attaching and Controlling Multiple Feeding and Finishing Devices to a Reproduction Machine." The basic modular architecture (i.e., multiple feeding and finishing architecture (MFFA)) of an electronic image processing apparatus in Platteter '775 inherently allowed the duplication of effort for developing feeding and finishing capabilities to be avoided by permitting and encouraging third party vendors to develop or adapt feeding and finishing devices that were compatible with standard print engines. More specifically, Platteter '775 permitted the document feeding and/or finishing modules to be interconnected with the print engine in a networked environment and organized in a sequence that meets the customer's needs for a fully automated job. This permitted finishing or feeder devices to be attached in any order that the operator decided was appropriate for the application.

MFFA generally includes a marking machine, a source of media, a controller, and a plurality of resources, wherein each of the resources includes an associated processor for storing data related to the operational timing of the associated resource. A bus interconnects the processors to the controller for directing the operation of the image processing apparatus to provide images on the copy sheets and the controller includes circuitry for interrogating each of the processors for the operational timing data and logic for responding to the operational timing data of each of the processors for dynamically configuring the controller to operate in accordance with the operational timing of the processors.

MFFA represents a complete change of direction. With MFFA, engineers need to design for mechanical and electrical connectivity and design the software such that the system can comprehend all types of feeding and finishing modules, even those that have not been developed yet. MFFA is a fully modular architecture that allows customers to select numerous feeding and finishing devices, connect them up, and produce a fully completed document. The modules are customer configurable in that they can reconfigure the modules to get the desired feeding and finishing combinations they desire.

To avoid the duplication of efforts for developing feeding and finishing capabilities and to allow third party vendors to develop or adapt feeding and finishing devices to standard print engines, the new system was developed. The system allows users to organize the document feeding and/or finishing accessories in the sequence that meets the needs for a fully automated job and to be able to attach finishing or feeder devices in any order that the operator decides is appropriate for the application.

However, there are customers that have DFA-compatible devices that were used on the earlier systems. These are expensive devices that the customers want to add to their new MFFA system. Second, there are feeding and finishing devices out there that are DFA-compatible that manufacturers do not currently make an equivalent MFFA device for. Thus, there is a need for an interface converter for print systems that will allow DFA or DFA-compatible devices to be connected to MFFA systems. Such a DFA device would only need to be pseudo-integrated, i.e., the MFFA system would know that there is a DFA device out there and would display a generic icon on the user interface showing the position of the device in the feeding or finishing chain. Also, when the DFA device has a jam, the MFFA system software would instruct all the devices upstream of that module to do an orderly shutdown. However, it would not be necessary for the MFFA system to know the internal architecture of the DFA device(s) and therefore not know what sheets and/or sets need to be remade. That is, the operator would still responsible for guaranteeing the integrity of the sheets/sets that are in the DFA device. Thus, the interface converter would allow DFA devices to attach to the new MFFA system.

BRIEF DESCRIPTION

In accordance with one aspect of the present exemplary embodiment, there is provided an apparatus for mutually converting signals between one or more modular printing devices and a document processing system. The apparatus comprises a device controller having a network interface for communicating with a system communications channel, memory for storing data and control code related to the operation of the modular printing devices, and a processor for running the control code; a digital input/output controller for receiving and sending document processing signals; a connector for receiving and sending modular printing device signals; and an optical input/output isolator for optically isolating the signals received via the connector.

In accordance with another aspect of the present exemplary embodiment, there is provided an electronic image processing system. The processing system comprises a plurality of modular devices; a printing system; and an interface converter for mutually converting signals between the modular devices and the printing system, the converter including a device controller, a digital input/output controller for receiving and sending printing system signals, a connector for receiving and sending modular device signals, and an optical input/output isolator for optically isolating the signals received via the connector.

In accordance with yet another aspect of the present exemplary embodiment, there is provided a method of converting signals and commands between one or more Document Finishing Architecture (DFA) or DFA-compatible devices and a Multiple Feeding and Finishing Architecture (MFFA) system. The method includes receiving information in the form of a DFA signal from the DFA device or a command from an interface converter, wherein the DFA signal may be offline status, faulted status, full status, or set delivered status and wherein the command may be a feed sheet command, a sheet exit command, an end of set command, a cycle-up command, or an end of job command; processing the DFA signal or the command via a processor in the interface converter; and communicating with either the system controller or the DFA device, depending on the information received.

DETAILED DESCRIPTION

Figure 1:
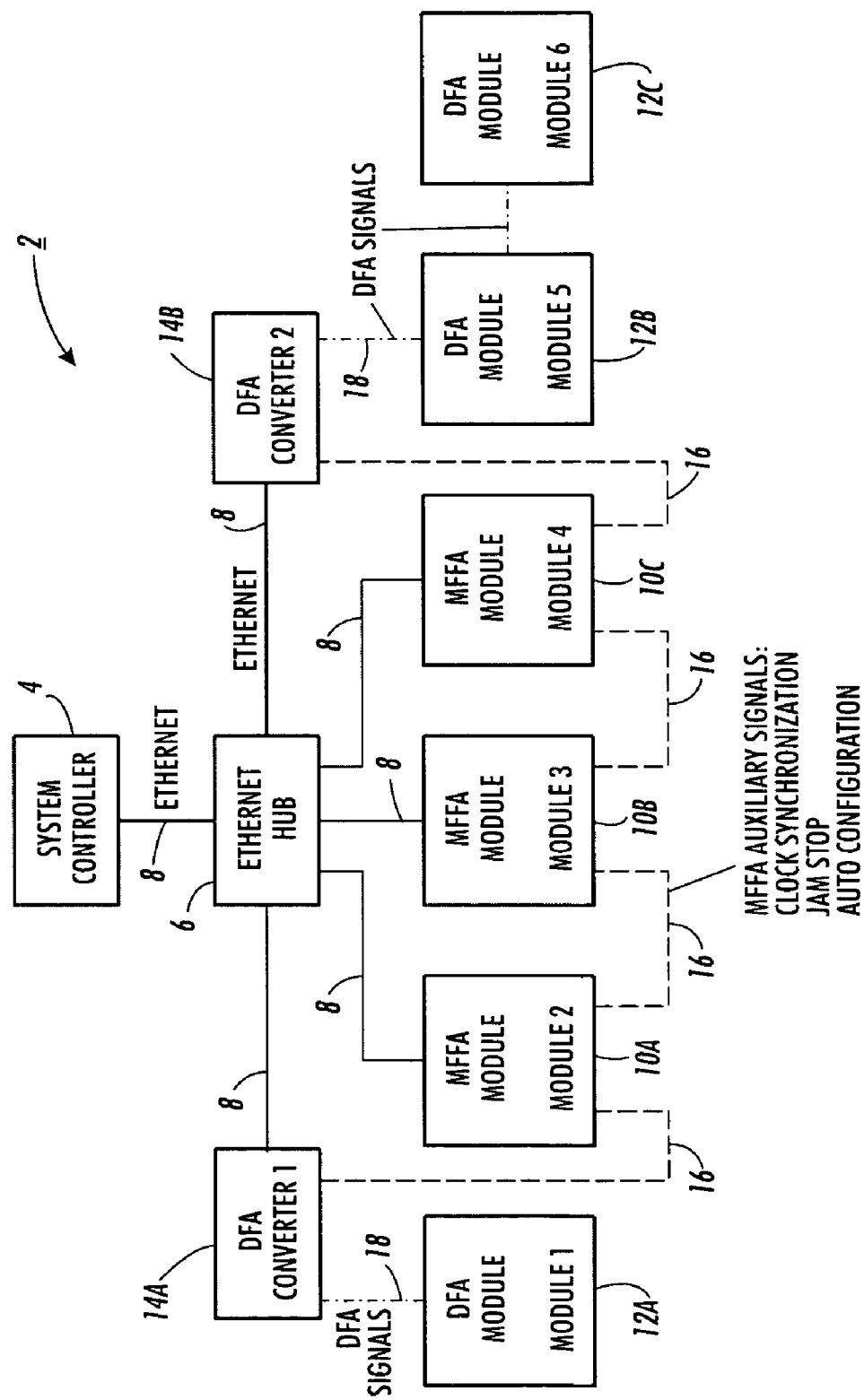
FIG. 1 is a block diagram depicting the physical layout of a print system incorporating the present exemplary embodiment.

With reference to FIG. 1, there is shown a print system 2. In the current embodiment, a system controller 4 including a user interface with screen (not shown) is interconnected to an Ethernet hub 6 via the serial communications channel (or command control bus) 8. The Ethernet hub 6 is also linked to any number of MFFA modules 10 and interface converters 14 via the communications channel 8. The communications channel 8 is typically Ethernet-based, 10 base T in the iGen family and is used to communicate between the modules 10 and to the system controller 4. "10 Base T" refers to a type of cable used to connect nodes on an Ethernet network. The number "10" refers to the transfer rate used on standard Ethernet, 10 Mbps. The term "Base" means that the network uses baseband communication rather than broadband communications. The letter "T" stands for twisted pair. The 10 Base T standard uses a twisted-pair cable with maximum lengths of 100 meters. "Ethernet" refers to a LAN protocol developed by Xerox in cooperation with Digital Equipment Corporation (DEC) and Intel in 1976. Ethernet uses a bus or star topology and supports data transfer rates of 10 megabits per second (Mbps) The Ethernet specification served as the basis for the IEEE 802.3 standard, which specifies the physical and lower software layers.

Additionally, MFFA auxiliary signals are exchanged between the MFFA modules 10 and the interface converters 14 via a set of MFFA signal links 16. The MFFA auxiliary signals generally comprise three discrete signals—Jam Stop, Autoconfiguration (or Autoconfig), and Clock Synchronization (or Clock Sync), which are transmitted over the signal links 16. Jam Stop is used to indicate to the preceding module that there is a jam and that the preceding module should stop sending media. Autoconfig is used during initialization to determine the ordering of the modules. Clock Sync is used to synchronize all the modules to the master clock time. Clock Sync is required in order to accurately feed media between modules and to synchronize media between modules.

The communications channel 8 allows full bidirectional communications between the system controller 4 and the MFFA modules 10. This allows for submission and tracking of each piece of media. This allows for full job recovery even within the module as each piece of media is tracked.

The print system 2 also includes any number of DFA modules 12, which are interconnected to the Ethernet hub 6 via the interface converters 14. DFA signals, which will be described later, are exchanged between the DFA modules 12 and the interface converters 14 via a set DFA signal lines 18.

The MFFA modules 10 may comprise any combination of document feeding, imaging and/or document finishing devices. The feeding devices are sources of printable media like paper for providing the marking engine or printer with stock for completion of the printing process, as described below. Feeding devices are generally paper trays, and the need for feeding devices is to supply an increased level of printable stock selection to the printer. This could be for the purpose of having multiple colors of tabs or separator stock or front and rear cover stock with a clear coversheet. Or it could be a check printing application where there is a variety of scenes pre-printed and each is fed in a collated order to build a check book with the proper cover sheets and rear cover stock. The imaging devices are generally print engines or markers for simplex and duplex operations. The finishing devices are well known in the art and can be any suitable devices such as sorters, compilers, staplers, folders, or trimmers. In the exemplary embodiment, MFFA module 10A (Module 2) is a document feeding device, MFFA module 10B (Module 3) is a print engine, and MFFA module 10C (Module 4) is a document finishing device.

The DFA modules 12 may comprise any combination of known document feeding and/or document finishing devices. In the exemplary embodiment, DFA module 12A (Module 1) is a document feeding device, such as a roll feeder, DFA module 12B (Module 5) is a document finishing device, such as a book binder, and DFA module 12C (Module 6) is a document finishing device, such as a shrink wrapper.

The feeding and finishing devices (12A, 10A, 10C, 12B, 12C) may be referred to collectively as resources with respect to the print engine or marker 10B of the print system 2. The resources are physically attached to the print system 2 such that sheets can be fed into the print engine 10B from the feeding devices (12A, 10A) and sheets or sets of sheets can be transferred from the print engine 10B to the finishing devices (10C, 12B, 12C). The resources are attached to each other such that sheets or sets of sheets can be transferred from one device to another. The modules must be accurately and precisely synchronized with a master module (i.e., print engine) in order to correctly perform the printing function. It should be understood that the mechanical specifications of how these resources are connected to the print engine 10B or to one another are not part of the present invention.

As shown FIG. 1, separate feeder and finishing devices may be chained together in order to provide system functionality at the preference of the operator. The modules can be added or removed by the user to provide the feeding and/or finishing capabilities they require. It should be noted that FIG. 1 is only one embodiment and meant to illustrate a functional view of the devices rather than actual physical placement. It is to be appreciated, however, that the document finishing and/or feeding functionality may be built up with individual modules that are inserted into a module base frame. These modules may include stacking, mailbox sorting, booklet making, binding, inserting, folding, etc. The operator can insert or remove modules depending upon the requirements for the current job.

The communications channel 8 defines a network that is responsible for communications between the system controller 4 and the printed wiring board assembly (PWBA) located in each of the MFFA modules. The network is a high speed communications network and in one embodiment provides the capability to address from one to 253 independent feeding and/or finishing devices. Each MFFA module 10 contains the intelligence to control its own operation. It also contains the timing and functionality specifications that are specific to the particular device. The removal of a device control from the system control enables the integration of most any device to the print system 2 without having to rewrite the print system control software. The device PWBA provides two functions, one is to provide an interface to the total system via the network and the other function is that of local control of the device. The device PWBA contains all the software needed to integrate the document feeding, imaging, or finishing device into the chain of devices controlled by the system controller 4. The communications portion of the software on the device PWBA is common on every PWBA in each of the devices. In addition there is software on the board that is used to control the specific feeding or finishing device.

Figure 2:
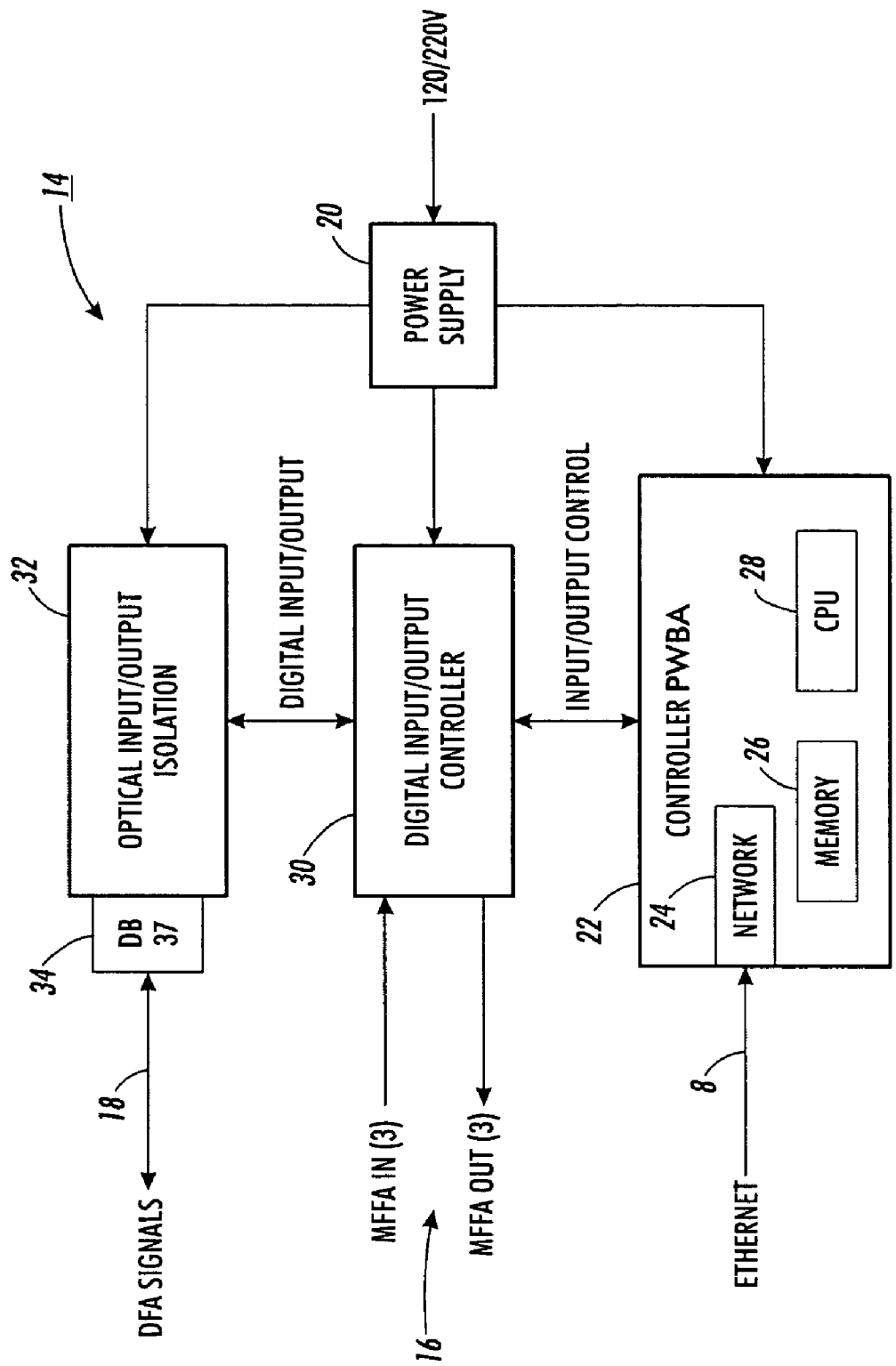
FIG. 2 is a schematic hardware diagram depicting an interface converter according to the present exemplary embodiment.

With reference now to FIG. 2, the interface converter 14 includes a standard power supply 20 for supplying power to the converter 14. The interface converter 14 further includes a controller PWBA 22 having a network interface 24 for communications via the Ethernet hub 6, memory 26 for storing data and control code related to the operation of the associated DFA module(s), and a CPU 28 for running the control code downloaded from the system controller 4. The control code is responsible for communicating with the system controller 4, responding to MFFA signals 16; and controlling and responding to DFA signals 18.

The interface converter 14 also includes a digital input/output controller 30 for receiving and sending MFFA auxiliary signals from the MFFA signal links 16. The signal links 16 consists of six wires, three signal lines and three corresponding return lines. One of the three signal wire pairs is Autoconfiguration. Autoconfiguration means that a device can be inserted into a document feeding or finishing chain and the print system 2 can determine the position of that device within the chain with no operator intervention. The device will treat the input end of the Autoconfiguration signal as an input to the device. Each device will be required to assert a given level signal for use by the next device in the chain for the output of the Autoconfiguration signal from the device when instructed to by the system controller 4.

The second signal wire pair on the signal links 16 is the Clock Synchronization signal. This signal will be used to synchronize the internal clocks of all of the modules in the print system 2. Feeding and finishing modules in the networked MFFA include clocks that must be accurately synchronized with a master clock in the master module, such as the marker or print engine, in order to correctly perform the printing function. This is because the master module controls all the scheduling between the feeding and finishing modules. As document processing systems became more sophisticated the accuracy and precision of the synchronization have become more and more important.

The third signal wire pair of the signal links 16 is reserved for Jam Stop. This signal is asserted by a module when it internally detects a jam. All modules upstream of that module then receive this signal and know to stop feeding media. This minimizes the amount of damaged media.

As shown in FIG. 2, for a typical interface converter PWBA 22, the DFA signals are optically isolated by an optical input/output isolator 32. This protects the interface converter electronics from the attached DFA device. Digital DFA signals are used either to control a third party device or get state information back from a third party device. Due to standards, the DFA connector 34 is a 37 pin D-shell connector. Of these pins, only a few wires are actually are used. As known in the art, for a typical DFA module 12 these wires may be defined as shown in Table 1 below:

TABLE 1

| NAME | FUNCTION | DFA DEVICE ACTION |
| --- | --- | --- |
| Status: Offline | Indicates that the DFA device is offline. | Device typically requires operator attention to place online. Specific operator action is device dependent. |
| Status: Faulted | Indicates the connected DFA device has a fault. | This status indicates that the DFA device requires operator attention. Typically indicates a device jam. |
| Status: Full | Indicates the DFA device is full. | Indicates the DFA device needs to be emptied. |

TABLE 1-continued

| NAME | FUNCTION | DFA DEVICE ACTION |
|---|---|---|
| Command: Sheet Exit | Indicates to a DFA device to get ready to receive a sheet of media. | DFA device should prepare to process a sheet of media. |
| Command: End of Set | Indicates to the DFA device that the sheet of media is the last of a set | Indicates to the DFA device that it should perform a set operation after processing the current sheet of media. |
| Command: Cycle up | Indicates that a DFA device should cycle-up in order to process a job. | DFA device turns on components in preparation to process a job. |
| Command: End of Job | Indicates to a DFA device that the job has completed | DFA device can cycle down |
| Status: Set Delivered | Indicates that a DFA finishing device has completed processing a set | System controller knows the DFA device has completed a set operation and that the set was successful |
| Command: Feed Sheet | Indicates that a DFA feeding device should feed a sheet | DFA device feeds sheet |

DFA is very limited because it only utilizes a limited set of signals. The module that the DFA device 12 is connected to can only indicate to a feeding module that it wants it to feed a sheet of media, and to a finishing device that it is sending it a sheet of media and when it is sending the finishing device the last piece of media so that the finishing device can perform a set operation if the device is capable. There is no knowledge of what happens in the DFA device 12 or what sheets are recoverable in the event of a jam. DFA devices usually have a local user interface, which is used to operate the DFA device 12. This user interface is completely independent of the rest of the system. When the DFA device 12 needs attention, it would typically indicate so through the use of the faulted signal. The rest of the system would then wait for this signal to be cleared before resuming operation. The local user interface would instruct the operator how to clear the fault in the device.

FIGS. 3-9 describe the various states of the interface converter 14 as well as what happens in those states. The states are slightly different depending on whether the DFA device 12 involved is a document feeding or finishing device.

Figure 3:
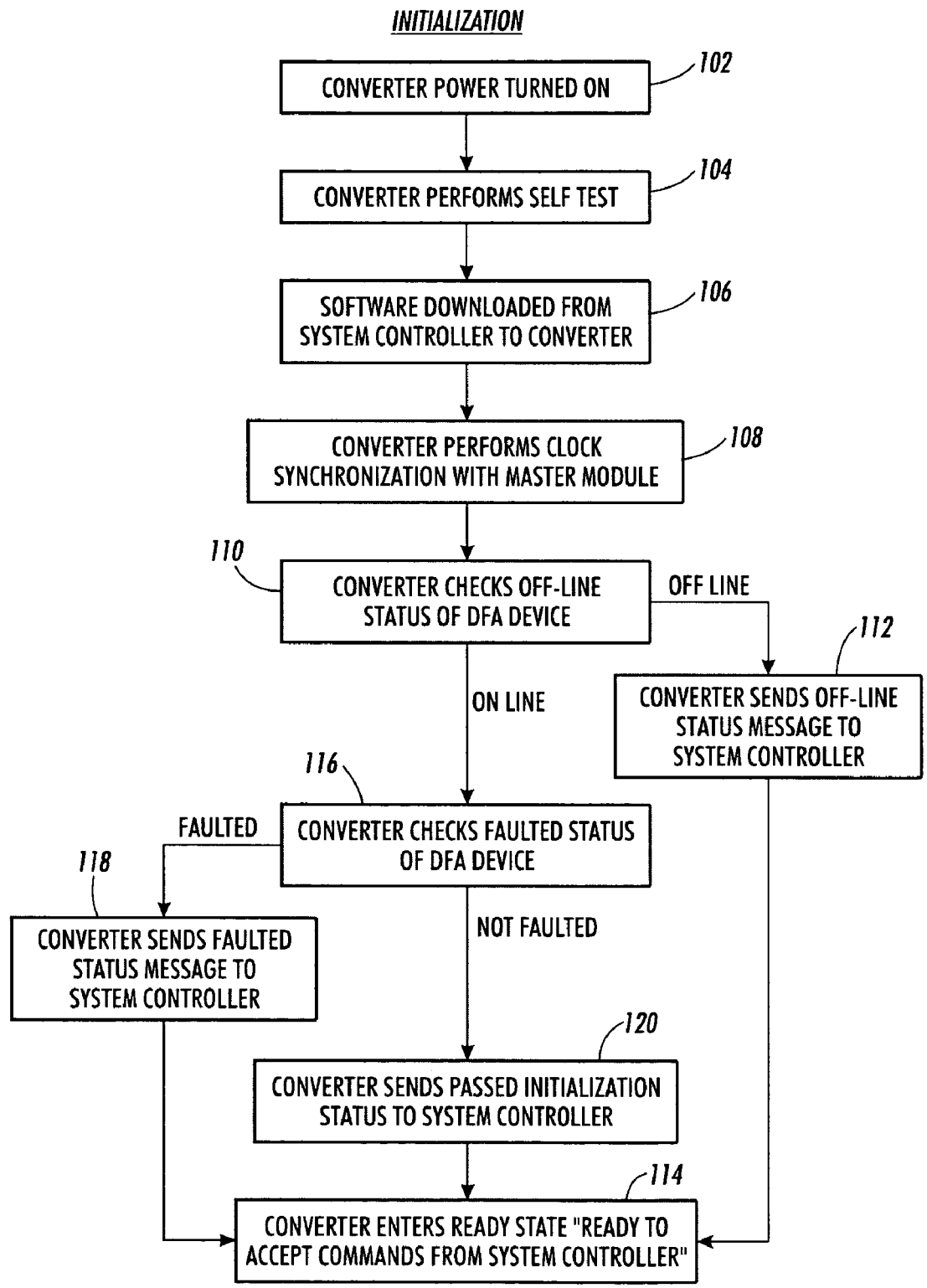
FIG. 3 is flow chart illustrating the initialization sequence according to the present exemplary embodiment.

The initialization sequence (same for both feeding and finishing devices) is shown in FIG. 3. This is initiated when power is applied to the interface converter 14. Initially, the converter power is turned on (102). Next, the converter 14 performs a self-test (104). This is to guarantee integrity of the interface controller electronics. Control software is then downloaded from the system controller 4 to the converter 14 (106). The converter then 14 performs clock synchronization with the master module (108). This synchronizes the internal clock used by the controller PWBA 22 with the rest of the system. The converter 14 checks whether the DFA device 12 is on-line or off-line by reading the status of the offline signal (110). If the status is "off-line," then the converter 14 sends an off-line status message to the system controller 4 (112), and the converter 14 then enters ready state, i.e., it is ready to accept commands from the system controller 4 (114). If, however, the status is "on-line," then the converter 14 checks the faulted status of the DFA device 12 by reading the status of the faulted signal (116). If the status is "faulted," then the converter 14 sends a faulted status message to the system controller 4 (118) and enters ready state (114). However, if the converter 14 checks the status of the DFA device 12 and it is "not-faulted," then the converter 14 sends a passed initialization status message to the system controller (120) and enters ready state (114).

Figure 4:
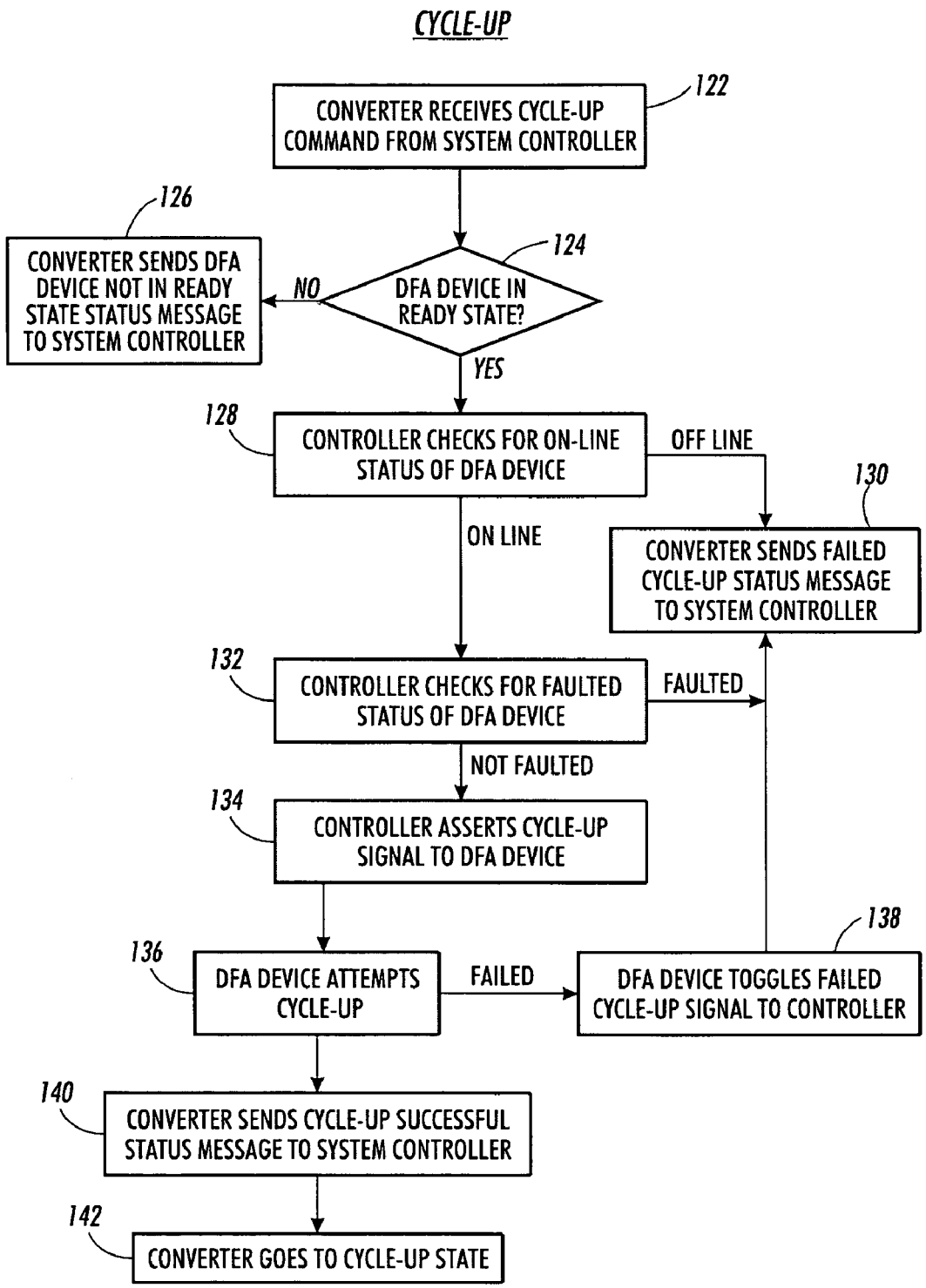
FIG. 4 is a flow chart illustrating the cycle-up command sequence according to the present exemplary embodiment.

FIG. 4 shows the cycle-up sequence. The cycle-up command from the system controller 4 is the same for both feeding and finishing devices. This is performed when a cycle-up command is sent from the system controller 4 to the interface converter 14, requesting that the DFA device 12 perform a cycle-up operation in preparation to process a job. The DFA device 12 must be in ready state to perform this command.

With continued reference to FIG. 4, the converter 14 initially receives a cycle-up command from the system controller 4 (122). Next, a determination is made as to whether the DFA device 12 is in ready state (124). It does this by reading an internal variable in memory 26 which contains the current state. If not, then the converter 14 sends a DFA device 12 not in ready state status message to the system controller 4 (126). Otherwise, the converter 14 checks for the on-line/off-line status of the DFA device 12 (128). If the status of the DFA device 12 is "off-line," then the converter 14 sends a failed cycle-up status message to the system controller 4 (130). Otherwise, the converter 14 checks for the faulted status of the DFA device 12 (132). If the status is faulted, then the converter 14 sends a failed cycle-up status message to the system controller (130). Otherwise, the converter 14 asserts a cycle-up signal to the DFA device 12 (134). Next, the DFA device 12 attempts to cycle-up (136). If this attempt fails, then the DFA device 12 toggles the failed cycle-up signal to the converter 14 (138). Upon detection of this signal, the converter 14 sends a failed cycle-up status message to the system controller (4) (130). Otherwise, the converter 14 sends a cycle-up successful status message to the system controller 4 (140). Next, the converter 14 goes to a cycled-up state (142).

Figure 5:
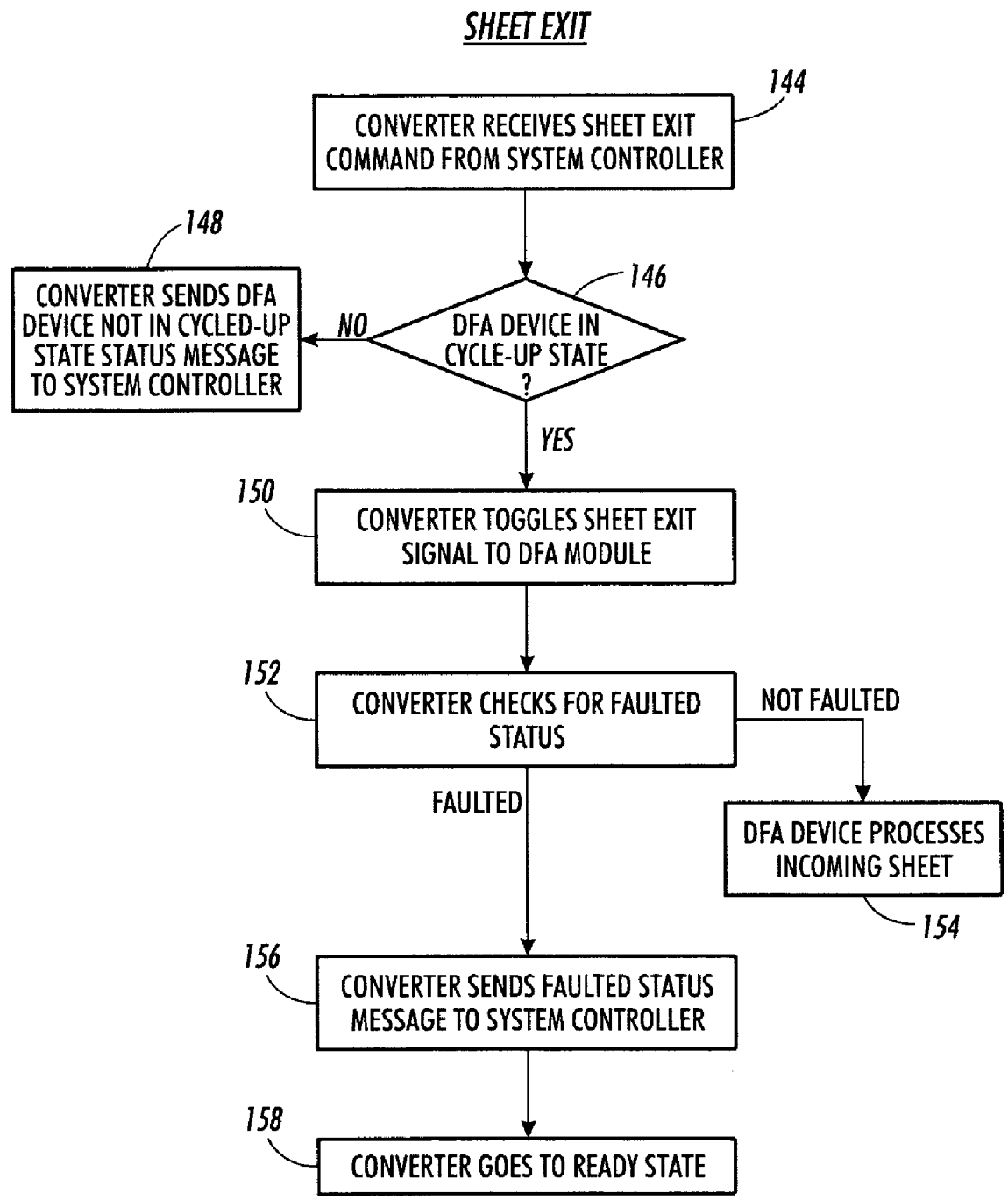
FIG. 5 is a flow chart illustrating the sheet exit command sequence according to the present exemplary embodiment.

FIG. 5 shows the sheet exit command sequence. This command is processed by the interface converter 14 when the DFA finishing device is to receive a sheet from the previous module. Initially, the system controller 4 sends a sheet exit command to the converter 14 (144). Next, a determination is made as to whether the DFA device 12 is in a cycled-up state (146). If it is not, then the converter 14 sends a DFA device not in cycled-up state status message to the system controller 4 (148). Otherwise, the converter 14 toggles a sheet exit signal to the DFA module (150). The converter then checks for the faulted status (152). If the status is "not faulted," then the DFA device 12 performs the necessary functions to process the incoming sheet (154). Otherwise, the converter 14 sends a faulted status message to the system controller (156). The converter then goes to ready state (158).

Figure 6:
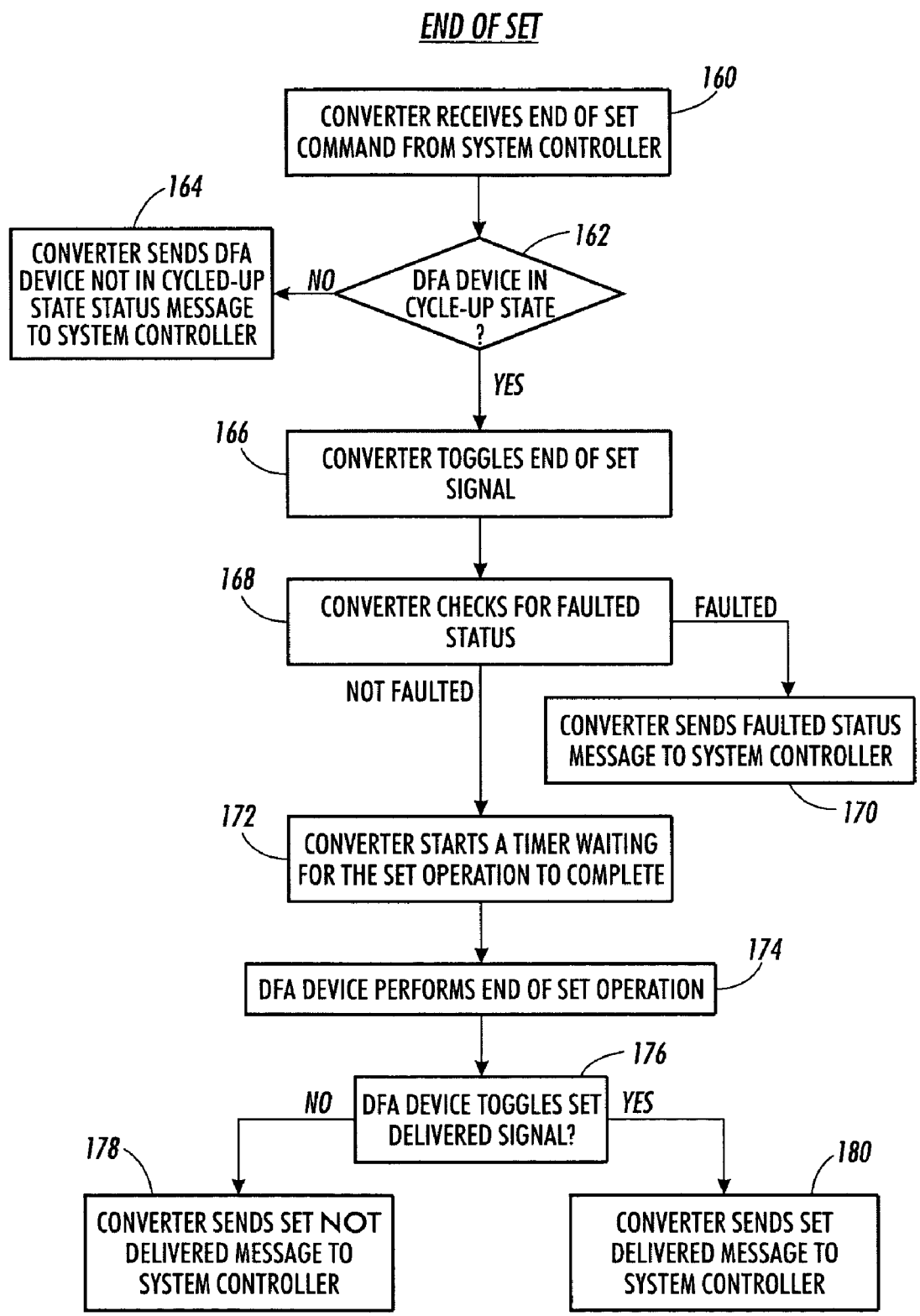
FIG. 6 is flow chart showing the end of set command sequence according to the present exemplary embodiment.

FIG. 6 shows the end of set command sequence. This command is sent to the converter 14 when the last sheet of a set is to be processed. This command indicates to the DFA device that is should perform a set operation on the sheets of a set. An example of this operation would be a staple or bind operation.

With continued reference to FIG. 6, the system controller 4 initially sends an end of set command to the converter 14 (160). Next, a determination is made as to whether the DFA device 12 is in the cycled-up state (162). If not, then the converter 14 sends a DFA device 12 not in cycled-up state status message to the system controller 4 (164). Otherwise, the converter 14 toggles an end of set signal (166). The converter 14 then checks for the faulted status (168). If the status is "faulted," then the converter 14 sends a faulted status message to the system controller 4 (170). Otherwise, the converter starts a timer waiting for the set operation to complete (172). Next, the DFA device 12 performs the end of set operation (174). The DFA device 12 then toggles a set delivered signal (176). If the set is not delivered when the timer expires, then the converter 14 sends a set not delivered message to the system controller 4 (178). Otherwise, the converter 14 sends a set delivered message to the system controller 4 (180).

Figure 7:
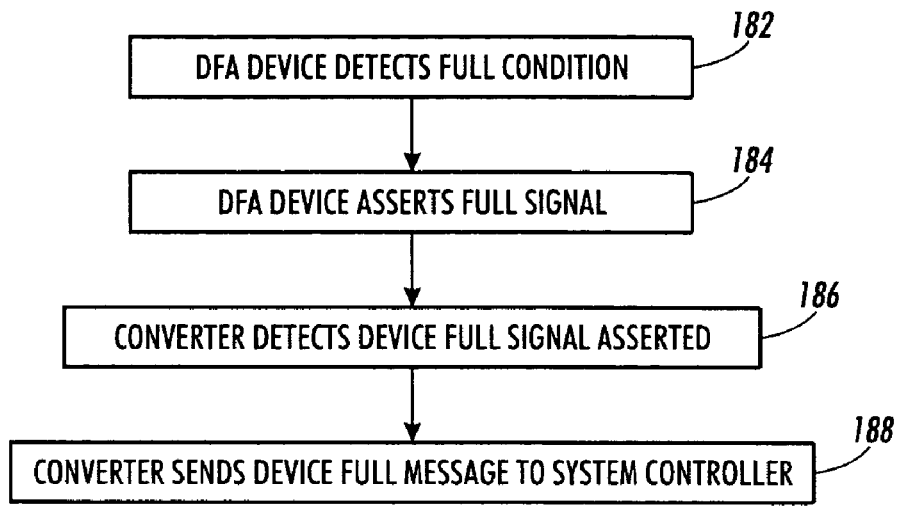
FIG. 7 is a flow chart showing the full signal command sequence according to the present exemplary embodiment.

FIG. 7 shows the full signal command sequence. This signal is used by DFA finishing devices that accumulate media or media sets. This signal is asserted when a DFA device determines that the device is full and needs to be emptied. Initially, the DFA device 12 detects a full condition (182). Next, the DFA device 12 asserts a device full signal (184). The converter 14 then detects the device full signal asserted (186) and sends a device full message to the system controller (188).

Figure 8:
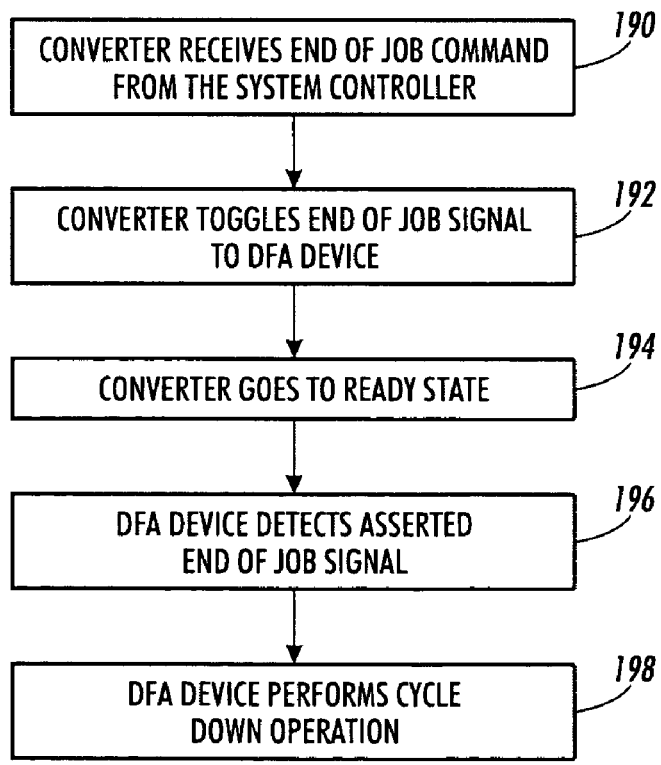
FIG. 8 is a flow chart showing the end of job command sequence according to the present exemplary embodiment.

FIG. 8 shows the end of job message sequence. This command is used by both DFA feeding and finishing devices. When this command is received from the system controller 4, it indicates that the DFA device 12 can cycle-down and enter the ready state. Initially, the converter 14 receives an end of job command from the system controller 4 (190). The converter toggles an end of job signal to the DFA device 12 (192) and goes to ready state (194). The DFA device 12 detects the asserted end of job signal (196) and performs the cycle-down operation (198).

Figure 9:
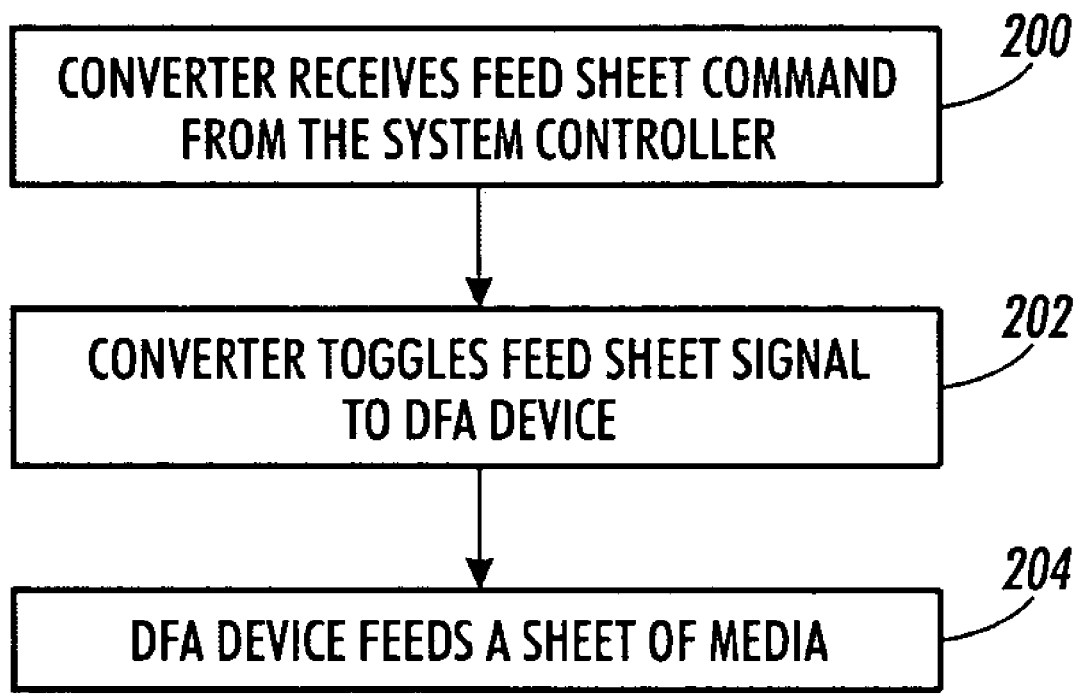
FIG. 9 is a flow chart showing the feed sheet command sequence according to the present exemplary embodiment.

FIG. 9 shows the feed sheet command sequence. This command is used by DFA feeding devices. This command is sent from the system controller 4 to the converter 14. This command indicates that the DFA device 12 should feed a sheet of media. Initially, the converter 14 receives a feed sheet command from the system controller 4 (200). The converter 14 then toggles a feed sheet signal to the DFA device 12 (202). The DFA device 12 then feeds a sheet of media (204).

A typical example of how a DFA device would use these commands is that the initialization sequence is performed when power is applied. The DFA device would then remain in the ready state until the system controller determined that it needed the DFA device to process a job. The system controller would then send a cycle up command to the converter which would then toggle a signal to the attached DFA device. The DFA device would then cycle up and wait for sheets to be delivered it for say a finishing device. If it were a set device, it would accumulate sheets until it was told to perform an end of set operation. When it received the end of set signal, it would perform the necessary functions to process the set. For say a binder, this would be a bind operation on the set. Once it finished the set operation it would indicate to the converter that it had completed the set operation by asserting the set complete signal. The device would continue in this sequence until it was issued a cycle down command. Once it received a cycle down command, it would cycle down its hardware and wait for the next time that it was requested to cycle up.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. An apparatus for mutually converting signals between a plurality of modular printing devices and a document processing system, the apparatus comprising:
    a device controller having a network interface for communicating with a system communications channel, memory for storing data and control code related to the operation of the modular printing devices, and a processor for running the control code;
    a digital input/output controller for receiving and sending document processing signals;
    a connector for receiving and sending modular printing device signals; and
    an optical input/output isolator for optically isolating the signals received via the connector; wherein the document processing system comprises a multiple feeding and finishing architecture (MFFA), wherein at least one of the modular printing devices comprises a device compatible with document finishing architecture (DFA) and wherein the modular printing device signals comprise one or more DFA signals.

2. The apparatus defined in claim 1, wherein the modular printing devices include one or more feeding devices.

3. The apparatus defined in claim 1, wherein the modular printing devices include one or more finishing devices.

4. The apparatus defined in claim 1, wherein the control code is responsible for allowing communication between a first printing device and a system controller, responding to a plurality of document processing signals.

5. The apparatus defined in claim 1, wherein the document processing signals comprise MFFA auxiliary signals such as autoconfiguration, clock synchronization, and jam stop.

6. The apparatus defined in claim 1, wherein the system communications channel comprises a 10 Base T channel.

7. The apparatus defined in claim 1, wherein the document processing system comprises a plurality of resources, the resources including one or more document feeding devices.

8. The apparatus defined in claim 1, wherein the document processing system comprises a plurality of resources, the resources including one or more document finishing devices.

9. The apparatus defined in claim 1, wherein the DFA signals comprise at least one of offline status, faulted status, full status, sheet exit command, end of set command, cycle-up command, end of job command, set delivered status, and feed sheet command.

10. An electronic image processing system comprising:
    a plurality of modular devices;
    a printing system; and
    an interface converter for mutually converting signals between the modular devices and the printing system, the converter including a device controller, a digital input/output controller for receiving and sending printing system signals, a connector for receiving and sending modular device signals, and an optical input/output isolator for optically isolating the signals received via the connector; wherein the printing system comprises a multiple feeding and finishing architecture (MFFA), wherein at least one of the modular devices comprises a device compatible with document finishing architecture (DFA) and wherein the modular device signals comprise one or more DFA signals.

11. The processing system defined in claim 10, wherein the device controller comprises a network interface for communicating with a system communications channel, memory for storing data and control code related to the operation of the modular devices, and a processor for running the control code.

12. The processing system defined in claim 10, wherein the modular devices comprise one or more document feeding devices.

13. The processing system defined in claim 10, wherein the modular devices comprise one or more document finishing devices.

14. The processing system defined in claim 10, wherein the device signals comprise MFFA auxiliary signals such as auto-configuration, clock synchronization, and jam stop.

15. The processing system defined in claim 10, wherein the DFA signals comprise at least one of offline status, faulted status, full status, sheet exit command, end of set command, cycle-up command, end of job command, set delivered status, and feed sheet command.

16. A method of converting signals and commands between printing devices of different architectures, the method comprising:
provided one or more Document Finishing Architecture (DFA) or DFA-compatible devices and a Multiple Feeding and Finishing Architecture (MFFA) system;
receiving information in the form of a DFA signal from a DFA device or a command from an interface converter, wherein the DFA signal comprises offline status, faulted status, full status, or set delivered status and wherein the command comprises a feed sheet command, a sheet exit command, an end of set command, a cycle-up command, or an end of job command;
processing the DFA signal or the command via an interface converter processor in the interface converter; and
communicating with either a system controller or the DFA device, depending on the information received.

17. The method defined in claim 16, wherein the interface converter comprises:
a power supply for supplying power to the interface converter;
a controller PWBA having a network interface for communications via an Ethernet hub, wherein the interface converter processor runs control code downloaded from the system controller, wherein the interface converter processor runs control code is responsible for communicating with the system controller, responding to MFFA signals, and controlling and responding to DFA signals.

18. The method defined in claim 17, wherein the interface converter further comprises:
a digital input/output controller for receiving and sending MFFA auxiliary signals from a plurality of MFFA signal links, wherein the signal links consists of six wires, three signal lines and three corresponding return lines.

19. The method defined in claim 18, wherein a first signal wire pair on the signal links is an Autoconfiguration signal, a second signal wire pair on the signal links is a Clock Synchronization signal, and a third signal wire pair on the signal links is reserved for Jam Stop.

20. The method defined in claim 16, wherein the DFA signal is optically isolated by an optical input/output isolator.

\* \* \* \* \*